UNITED STATES PATENT OFFICE.

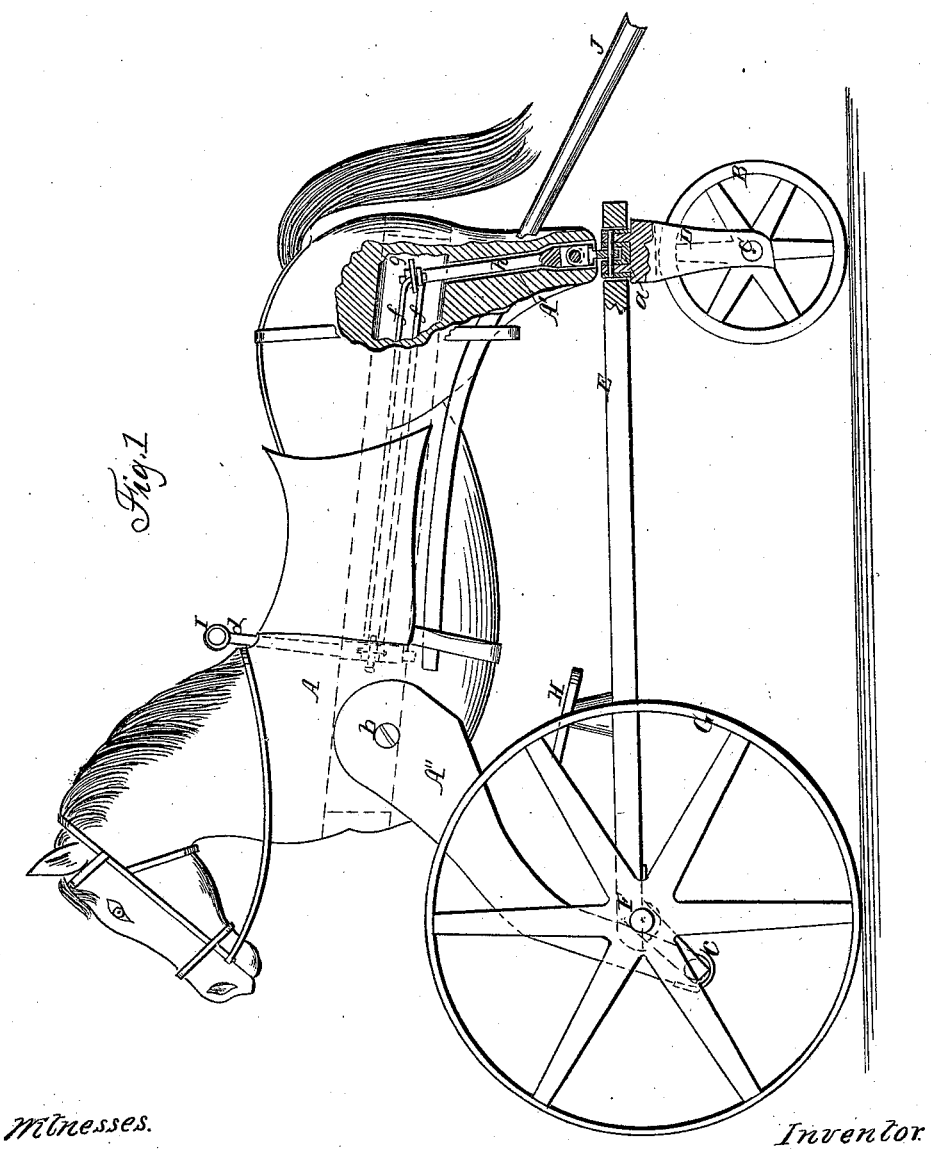

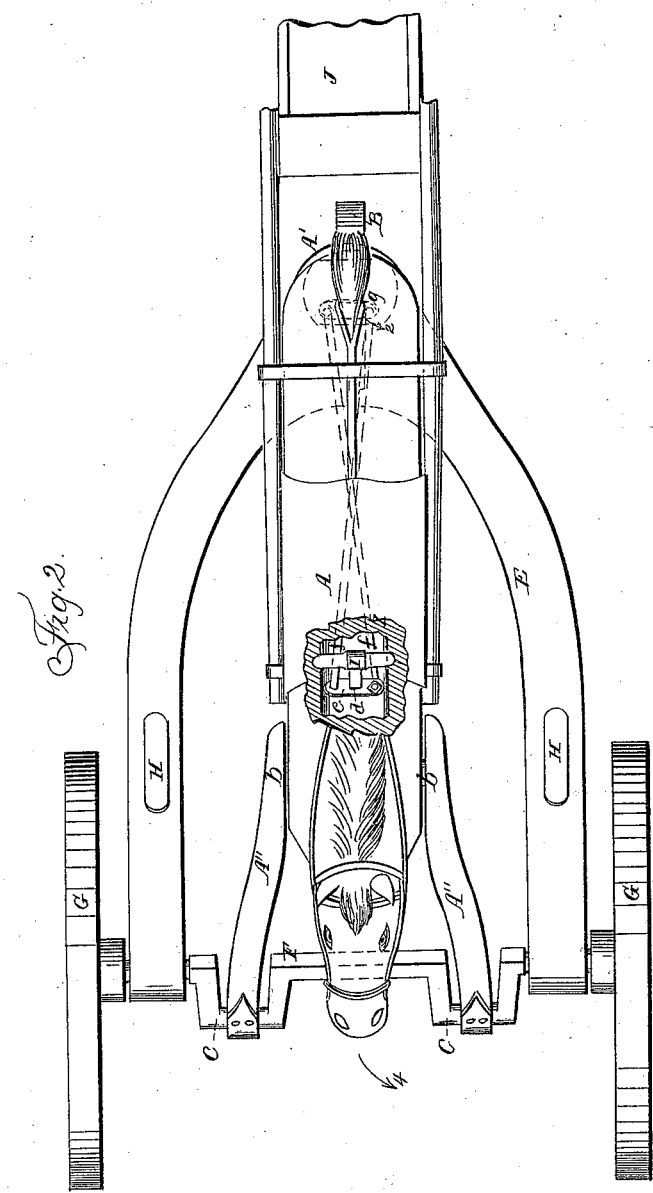

P. W. MACKENZIE, OF JERSEY CITY, NEW JERSEY.

IMPROVEMENT IN CANTERING PROPELLERS.

Specification forming part of Letters Patent No. 36,161, dated August 12, 1862.

*To all whom it may concern:*

Be it known that I, P. W. MACKENZIE, of Jersey City, in the county of Hudson and State of New Jersey, have invented a new and Improved Cantering Propeller; and I do hereby declare that the following is a full, clear, and exact description of the same, reference being had to the accompanying drawings, making a part of this specification, in which—

Figure 1 is a sectional side elevation of my invention. Fig. 2 is a sectional plan or top view of the same.

Similar letters of reference indicate corresponding parts in the two figures.

The object of this invention is to connect in a convenient and durable manner a hobby-horse or other toy of a similar nature to wheels, so that by imparting to the horse a cantering motion the wheels will be rotated and the toy propelled to any desired place and in any desired direction.

The invention consists in the arrangement of a universal joint connecting the hind legs of the horse or the fulcrum of the cantering toy to the steering-wheel, in combination with a suitable steering-gear, in such a manner that the steering-wheel can be turned in either direction without interfering with the cantering motion of the horse.

It consists, further, in connecting the upper ends of the fore legs to the body of the horse by means of hinges or pivots and their lower ends to cranks in the axle of the fore wheels in such a manner that during the operation of the toy the motion of the fore legs of a cantering horse is imitated.

It consists, also, in the arrangement of foot-rests or false stirrups, in combination with the handle of the steering-gear or some other suitable projection that may be rigidly attached to the front part of the horse's body in such manner that by throwing the weight of the body on the false stirrups and raising the horse by means of the steering-handles or other suitable projection the rider can start the same from the most unfavorable position the cranks may assume.

It consists, finally, in arranging two double-armed levers—one on the arbor which carries the steering-handles and one on the stem of the steering-wheel—in combination with diagonal cords or chains connecting the opposite ends of the double-armed levers in such a manner that by turning the steering-handles to the right the horse is also turned to the right, and by turning the handles to the left the horse is also turned to the left, and that by tying belts to said handles the action of the bridle on a real horse is imitated.

To enable those skilled in the art to make and use my invention, I will proceed to describe its construction and operation with reference to the drawings.

The horse A rests with its hind legs, A', on the steering-wheel B, which rotates on an axle, C, that has its bearings in the ends of a double-armed forked pendant, D. The upper end of this pendant is rounded, and turns freely in the rear end of the platform E, and it connects to the hind legs, A', by a universal joint, $a$, so that the steering-wheel can be turned in either direction without interfering with the cantering motion of the horse.

The front legs, A'', are connected at their upper ends to the body of the horse by means of pivots $b$, and their lower ends are jointed to cranks $c$ on the shaft F, which forms the axle of the fore wheels, G. Said axle forms at the same time the supports for the front end of the platform E, and as it rotates the lower ends of the legs A'' are thrown in and out and the motion of a cantering horse is imitated.

The platform E is provided with foot-rests or false stirrups H, and a handle, I, projects from the neck or fore part of the body of the horse, so that when the cranks $c$ are on their lowest centers the horse can be started by throwing the weight of the body on the stirrups H and raising the front part of the horse by means of the handle I, and in the same manner, in order to keep the horse in motion, the weight of the body is alternately thrown on the back of the horse and then again on the stirrups H.

A little practice will enable very small boys, even, to acquire the necessary movement for the purpose of propelling the horse, and the motion of the horse may be further facilitated by attaching to it a small carriage, J, which projects beyond the hind legs, A', and which is capable to receive a baby or small child. By this attachment the center of gravity is carried farther back than before, and the fore legs of the horse will have a tendency to rise and to turn the cranks beyond their lowest centers. The handle I, which is used to raise the fore part of the horse, serves at the same time to steer the same. It is secured to the upper end of a vertical arbor, $d$, the lower end of which carries a double-armed lever, $e$, and the ends of this lever connect, by diagonal chains or cords $f$, with the opposite ends of a similar lever, $g$, that is secured to the stem $h$ of the pendant D, so that by turning said handle in the direction of arrow 1, Fig. 2, the pendant with the steering-wheel turns in the direction of arrow 2, and the horse, instead of moving in a straight line, turns off in the direction of arrow 4. By these means a pull on the right-hand side of the handle turns the horse to the right, and a pull on the left-hand side turns the horse to the left, thus imitating the action of the bridle on a real horse.

It is obvious that, instead of a horse, the shape of any other animal or device might be given to my toy; but for general use the shape of a horse is the most convenient, and it is sufficient to illustrate my invention.

I do not claim, broadly, converting the cantering motion of a horse or other toy in a continuous rotary motion, as this object has been previously accomplished by different means; but,

Having thus fully described my invention, what I claim as new, and desire to secure by Letters Patent, is—

1. The arrangement of the universal joint $a$, in combination with the hind legs, A′, or the fulcrum of the cantering toy and with the steering-wheel B, constructed and operating substantially in the manner and for the purpose described.

2. The hinged legs A″, in combination with the body of the horse and with the cranks $c$, as and for the purpose specified.

3. The arrangement of the foot-rests or false stirrups H, in combination with the handle I, constructed and operating substantially as and for the purpose set forth.

4. The arrangement of the double-armed levers $e$ $g$ and diagonal cords $f$, in combination with the handle I and steering-wheel B, constructed and operating substantially as and for the purpose shown and described.

P. W. MACKENZIE.

Witnesses:
RICHARDSON GAWLEY,
JAMES LAIRD.